United States Patent [19]
Charlesworth

[11] 3,866,020
[45] Feb. 11, 1975

[54] BRAILLE TAPE READER

[75] Inventor: David Valentine Charlesworth, Seaford, England

[73] Assignee: Clarke & Smith Manufacturing Company Limited, Wallington, Surrey, England

[22] Filed: July 10, 1973

[21] Appl. No.: 377,960

[30] Foreign Application Priority Data
July 11, 1972 Great Britain.................... 32284/72

[52] U.S. Cl.............................. 235/61.11 D, 35/38
[51] Int. Cl......  G06k 7/08, G06k 9/00, G09b 21/00
[58] Field of Search...235/61.11 R, 61.11 A, 61.11 B, 235/61.11 C, 61.12 R, 61.12 N; 35/38

[56] References Cited
UNITED STATES PATENTS
| | | | |
|---|---|---|---|
| 2,453,239 | 11/1948 | Luhn........................... | 235/61.12 R |
| 2,521,338 | 9/1950 | Bryce et al................... | 235/61.12 R |
| 3,624,772 | 11/1971 | Grunwald..................... | 235/61.12 N |

*Primary Examiner*—Daryl W. Cook
*Attorney, Agent, or Firm*—Lawrence E. Laubscher

[57] ABSTRACT

Tactile script apparatus of the type in which electrical signals are converted into corresponding characters in tactile script, characterized in that storage means are provided for storing code data identifying at least one group of characters to be read, in combination with tactile presentation means responsive to said code data for presenting the group of characters in tactile script. Manually operable means are provided for enabling the tactile presentation means to present a fresh group of characters, whereby the reader can control the rate at which fresh characters are presented for reading to suit his convenience while the storage means enables fresh character signals to be stored at different times and instantaneous rates.

6 Claims, 3 Drawing Figures

BRAILLE TAPE READER

This invention relates to reading tactile script, that is to say a script which can be read by feeling it.

A very well known example of a tactile script is the Braille script, in which the characters are represented by so called cells each having six raised dots in a three-by-two rectangular matrix, the presence or absence of individual dots discriminating the different Braille characters. The Braille characters represent various alphanumeric characters, punctuation marks and some common entire or partial words. Other tactile scripts have also been proposed.

A book in a tactile script is bulky, and in particular is very much larger than the same book printed in conventional alphanumeric characters. A Braille cell occupies roughly 5 to 10 times the area allowed for a typical alphanumeric character. This presents a particular problem of space for storing books in a library. It also presents a problem in distributing books to blind people, for example by postal services.

It is possible to record a person reading a book aloud, and distribute the recordings to blind people, the so-called Talking Book Service. The recordings can be made on magnetic tape, in cassettes which are much less bulky than the corresponding book in Braille. However reading a book in this way is not always satisfactory.

Computer terminals can provide signals to a Braille embosser, which prints Braille characters on paper. However known embossers are expensive in computer time and are costly to produce.

An object of the present invention is to provide an improved tactile script apparatus by which electrical signals may be converted into corresponding characters in tactile script.

The invention provides tactile script apparatus including storage means for storing code data identifying at least one group of characters to be read, tactile presentation means responsive to said code data for presenting said group of characters in tactile script, and manually actuable means for enabling said tactile presentation means to present a fresh group of characters.

The reader can control the rate at which fresh characters are presented for reading to suit this convenience while the storage means enables fresh character signals to be stored at different times and instantaneous rates. The character signals may be produced by magnetic tape playback apparatus, playing back tape recordings intermittently at normal speeds. Such tape recordings may be distributed in the same manner as the Talking Book records and, due to their small size, may readily be held in collections, whether privately or in central libraries. Alternatively, for example, the character signals may be produced by an output data processing apparatus, which is only required to produce the signals intermittently and at a rate which can be different from the rate at which the user reads the characters.

Embodiments of the invention will now be described by way of example with reference to the accompanying drawings in which.

Figure 1:
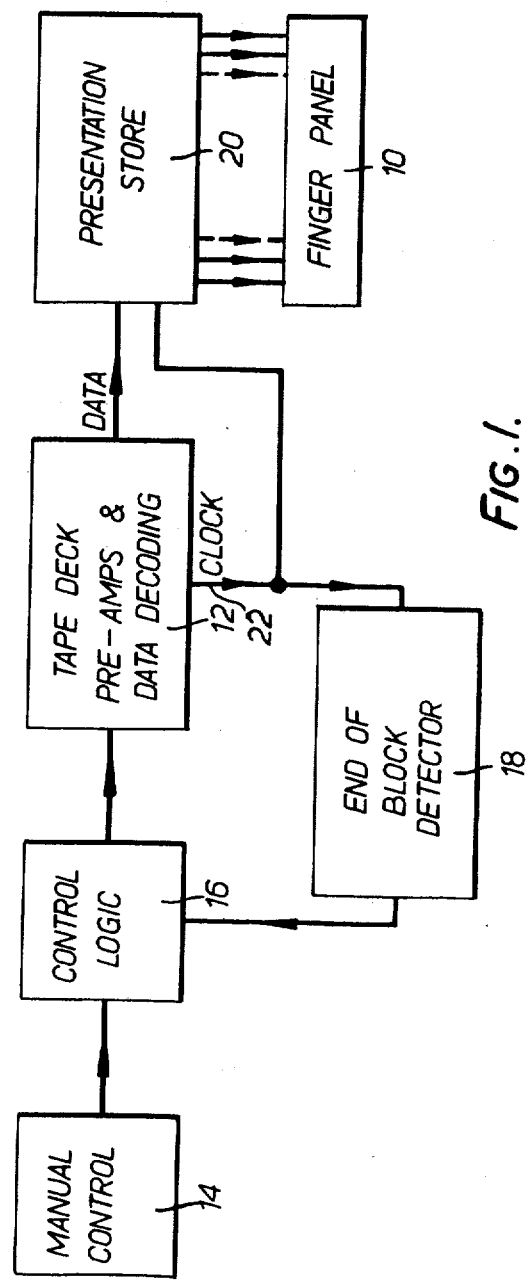
FIG. 1 is a simplified block diagram of a playback apparatus in accordance with the present invention.

The drawings illustrate a system for reading tactile script. The system illustrated uses a removable and transportable data storage medium in which code signals are stored, the code signals identifying the various characters in tactile script of the material to be read. The reader has a playback apparatus comprising tactile presentation means for actuation to present characters in tactile script and read-out means for receiving the data storage medium and responding to the code signals stored in it to actuate said tactile presentation means to present corresponding characters in succession for tactile reading.

The data storage medium may comprise a variety of media, for example punched tape, magnetic disc, or optical film but the preferred embodiment uses magnetic tape. The code signals are preferably binary signals and for Braille characters a bit (binary digit) in a code signal represents the presence or absence of a dot in the corresponding Braille cell. When using magnetic tape, the code signals are preferably coded in a serial binary code in a single track, as in the preferred embodiment, although for example a parallel or series-parallel binary code can be envisaged for Braille in which the bits representing a single Braille character are recorded in a plurality of tracks, the code signals for successive characters being recorded sequentially.

Spoken index announcements may also be recorded on the tape, possibly in one or more separate tracks, at high tape transport speeds for playback audibly to the reader by the playback apparatus during fast winding of the tape to assist the reader to find a particular passage.

In the preferred embodiment, the tactile presentation means includes a group of cells each comprising a group of members disposed for touching by the reader, in positions corresponding to the elements of the characters of the tactile script employed, and displacements means for displacing selected members so as to present any particular character. For Braille script, each cell preferably comprises a group of six pins extending through a surface with their ends grouped at the surface in a three-by-two rectangular array, the pins being individually longitudinally displaceable to protrude from the surface so as to present the character. It is possible to vibrate the selected pins but in the preferred embodiment the selected pins project steadily, the ends of the other pins being flush with the surface.

Instead of the reader feeling the pins directly, it would alternatively be possible for the tactile presentation means to print out the characters by pressing the pins of one or more cells onto a band or tape to impress the characters on the band or tape, from which the reader would read tactilely. Alternatively, instead of feeling the pins directly, one or more cells of pins may be used to impress the characters on a band. The band could be an expendable tape although the quantity of tape required is prohibitive for some applications. Otherwise, the band can be reusable, if the band is formed into an endless loop, characters can be impressed on the band at one station, read at a second station, and subsequently erased at a third station. A continuous band of thermoplastic material may be used, means being provided for heating the band to erase the characters after they have been read to enable fresh characters to be printed out.

In another form, a continuous band of resilient material has pegs inset into it in cells. The pegs are loosely gripped by the resilient material and may be displaced by the pins to project from the surface of the band, where they may be felt by the reader. After reading, the pegs may be pushed down, by a roller for example, to erase the characters. In yet another example, a character may be presented by applying an electric potential to selected ones of an array of stationary pins forming electrodes to be felt by the reader, the current flow being limited to a safe value, while still enabling a reader to sense the character presented. However, in the preferred embodiment the reader feels directly pins displaced mechanically as described above.

In the preferred embodiment the displacement means comprises a respective displacement element for each pin. A mechanical latch may be provided for holding the pin in its protruding position, the mechanism including means for disabling the latches, for example in response to a signal from the read-out means, so as to allow all the pins to return to the flush position under mechanical bias, or for causing the pins to return to the flush position by overriding the force exerted by the latches. The displacement element preferably comprises a solenoid for displacing the respective pin although other electro-mechanical transducers, such as piezo-electric transducers, or pneumatic transducers could be used.

The read-out means comprises a temporary "presentation" store for storing the data of the code signals from the data storage medium corresponding to a complete presentation by said tactile presentation means, so that the presentation may be held without necessarily continuously reading out code signals from the data storage medium. The presentation store may comprise electrical latches performing the function of the mechanical latches referred to above. In the preferred embodiment the presentation store comprises a store, such as a shift register, having parallel outputs coupled to the respective elements of the tactile presentation means for storing the electrical signals, and the latches may be omitted.

The read-out means could additionally include a buffer store for storing code signals for a complete presentation and controllable to feed code signals to the presentation store to change the presentation; this would enable the content of the presentation store to be changed without necessarily simultaneously reading out code signals from the data storage medium. The buffer store could also be controllable to store code signals from the presentation store, thus storing code signals corresponding to one or more characters previously presented, and be selectively operable to transfer these code signals back to the presentation store to enable the characters to be presented again. However in the presently preferred embodiment, fresh data is read-out from the data storage medium each time the content of the presentation store is to be changed, rendering the buffer store unnecessary.

Particularly where the presentation means prints the characters out onto a band of tape, a single cell, or a plurality of cells operating in parallel, is sufficient. The presentation means can print out a line of script at high speed and then pause until a fresh line of script is required by the reader. However, in the preferred embodiment, the tactile presentation means comprises a finger panel which is felt directly by the reader and which preferably includes a line of Braille cells, which may include at least ten and preferably more than twenty cells. The presentation store is arranged to change the characters presented by a whole line of cells on the finger panel substantially simultaneously and hold the line of characters until a fresh line of characters is to be presented. In each case, the reader may read the line of characters at his own time and speed, without the playback apparatus having to follow all the readers movements, since he actuates the change at will by means of a manually actuable control. This control causes fresh code signals to be transferred to the presentation store to enable the finger panel to present the next line of characters.

A further manually actuable "step back" control may be provided to cause the finger panel to present again the previous line of characters. It would be possible to give the reader access to the previous line of script by providing a plurality of lines on the finger panel whose presentations were changed alternately on actuating the step forward control. However this would involve duplication of cells in the finger panel and in the preferred embodiment it is preferred to wind the tape back and then read-out the relevant data again.

Figure 3:
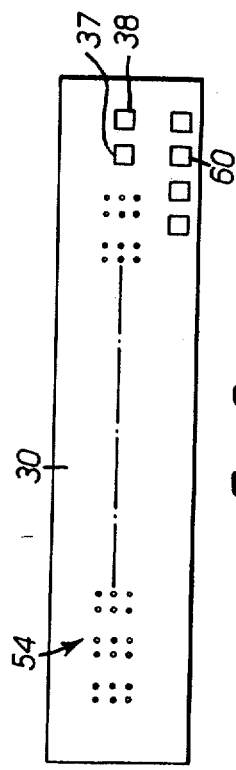
FIG. 3 is a diagrammatic plan view of the finger board.
Figure 2:
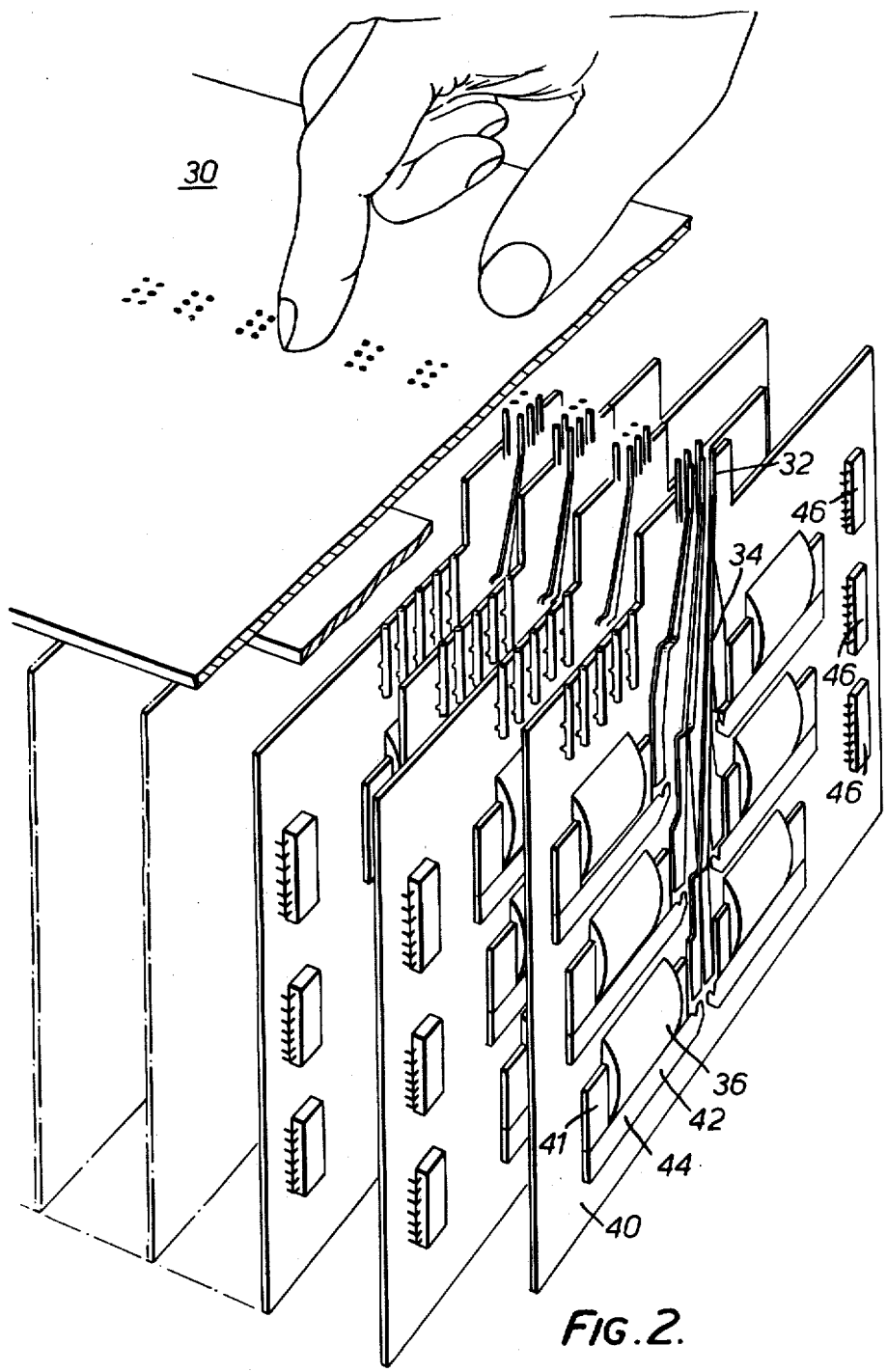
FIG. 2 is a simplified perspective view of part of a finger board in the playback apparatus.

Referring now to the drawings in more detail, the playback apparatus comprises a finger panel 10 shown in more detail in FIGS. 2 and 3 and controlled by a read-out unit. The read-out unit comprises a tape playback machine 12 for receiving a magnetic tape cassette (not shown) and reproducing code signals, clock pulses and spoken index signals recorded on the tape. Various suitable machines are available, which include a pick-up head for one or more tracks and a tape drive mechanism for driving the magnetic tape past the pick-up head. The playback machine 12 is controlled by manually actuable machine control 14, through a logic circuit 16 which control a "pause" control in the playback machine. A suitable signal from manual controls 14 starts the tape in the forward direction and a signal from an "end of block" detector 18 stops the tape again. Signals from the pick-up head are supplied to the serial input of a presentation store 20, which comprises a single serial input shift register having parallel outputs. The shift register is in fact formed by a plurality of shift register circuits connected in series. Shift pulses for the shift register 20 are supplied from a clock pulse output 22 of the tape playback machine 12. The clock pulses are also supplied to the end of block detector 18, to control the read-out of the tape. The parallel outputs of the shift register 20 are connected to respective drive elements (not shown) which drive respective solenoids in the finger panel 10.

FIGS. 2 and 3 show one example of the finger panel 10 which comprises a plate 30 having apertures therein to accommodate respective pins such as 32. The ends of the pins are grouped in cells at the surface of the plate 30, each cell having dimensions approximately ¼ × ⅛ inch (6.26 × 3.12mm) each cell preferably comprising six pins arranged in a rectangular array 3 × 2. The pins are formed by the ends of respective push rods such as 34 which project beneath the plate and are coupled to respective solenoids such as 36 which can be energised selectively to cause the selected pins to project from the surface of the plates 30 a sufficient distance to be felt readily by a finger. When the solenoids are de-energised the pins all return to their rest position in which they are flush with or slightly below the surface of the plate 30 under the bias of return springs (not shown). Accordingly, the solenoids such as 36 can be individually energised to raise the respective pins such as 32 to simulate any desired Braille character. Twenty-five such cells are provided in line on the plate 30, this number being a convenient number for a line of Braille script. Step forward and step back buttons 37 and 38, respectively, are provided at the right hand end of the line of cells so that a reader, after passing his fingers along the line of cells to read the line of script, may actuate one or other of the buttons to select the following or previous line of script. Other manually actuable controls 60 are provided on the finger panel and, together with the buttons 37 and 38 constitute the machine controls 14 indicated in FIG. 1 which control the tape playback machine. The controls 60 may include a power on/off switch, a tape fast forward select button, a tape fast rewind select button and a tape normal play select button.

The six push-rods such as 34 and the six solenoids such as 36 for each cell are mounted on a respective support board, of the kind known as a printed circuit board, such as 40. The solenoids have cores such as 41 coupled to armatures such as 42, the armatures being pivoted at one end, as at 44 and engaging the respective push rod at the other. To minimise the thickness occupied, the push rods and the cores and armatures of the solenoids are formed from strip material mounted with its major surface parallel to the board. Other electrical components such as 46 providing the shift register for the relevant cell are also mounted on the board. To facilitate production, the components are all mounted on the same side of the board, electrical connections which are also supported by the board being made on the other side of the board by suitable techniques. The magnetic tape has a plurality of tracks. In one track code signals identifying the characters of the script to be read are recorded. The code signals are encoded in a non-return-to-zero series binary code, each bit representing the presence or absence of a dot in the corresponding Braille cell. The signals are recorded in blocks of 150 bits separated by a gap of the order of 0.1" (2.5mm), the purpose of the gap being to accommodate the time lags involved in starting and stopping the motion of the tape during read-out. Each block of 150 bits corresponds to 25 characters or one line of cells on the finger panel. Assuming a tape length of 581ft (175m) and a recording density of 600 bits/inch (23,500 bits/m) approximately 3 millin bits can be recorded on one track of the tape, corresponding to approximately 500,000 characters. This corresponds roughly to 180 pages of a conventional book and accordingly a cassette containing this length of tape can store data for reading a passage corresponding to a medium sized book. The size of the cassette may be less than half that of the corresponding book in conventional printed script. Spoken indexes indicating the position of the tape or the position in the book are recorded in the track on the tape at high tape transport speeds. This track is played back by fast winding of the tape, and amplified in an amplifier connected to a loud speaker (not shown) to give an audible indication to assist the reader in locating a particular passage to be read.

Clock pulses are extracted from the code signals, by rectifying the positive and negative excursions of the non-return-to-zero code used; alternatively clock pulses could be recorded in a separate track on the tape. The clock pulses are used both as shift pulses for the shift register 20 and also to operate the end of block detector 18, which comprises an envelope detector circuit responding to the absence of clock pulses in the interblock gap on the tape. For normal forward running, the detector 18 is arranged to halt the tape in the interblock gap after playing back the data in the relevant block in response to actuation of the step forward button 37. Actuation of the step back button 38, on the other hand causes the tape to be wound back two blocks to the start of the previous block, as detected by the second signal from the detector 18, the tape drive then being reversed automatically to play back that block, and the tape being halted again at the end of that block by a signal from the detector 18.

I claim:

1. Tactile script presentation apparatus comprising:
   a. read-out means for receiving a data storage medium on which data is stored identifying groups of characters to be presented and operable to read-out said data;
   b. data storage means capable of receiving and storing data representing a complete group of characters;
   c. manual control means operable to cause rapid read-out from said read-out means of data representing one complete group of characters at a time for supply to said data storage means; and
   d. tactile presentation means controlled by the data in said data storage means for presenting simultaneously in tactile script a stationary array of all of the characters of the group represented by the data stored in said data storage means, whereby said characters can be selected for presentation group by group one complete group at a time, said tactile presentation means comprising
      1. a stationary finger plate containing a row of cells each consisting of a plurality of apertures;
      2. a plurality of pins associated with said apertures, respectively, each of said pins being arranged normal to said finger plate for movement between a normal withdrawn position in which the pin is withdrawn from the finger plate and an inserted position in which one end of the pin extends through the associated aperture and projects from the surface of the finger plate; and
      3. displacement means for axially displacing selected ones of said pins from the withdrawn position to the inserted position, thereby to present selected characters for reading by feeling the selected pins.

2. Apparatus as claimed in claim 1, wherein said manual control means is responsive to the data stored on said data storage medium for halting read-out of said data following read-out of a complete group.

3. Apparatus as claimed in claim 1 for use with magnetic tape providing said data storage medium, said read-out means including pick-up means and a tape transport mechanism for transporting the magnetic tape past said pick-up means, whereby said pick-up means responds to data recorded on said tape.

4. Apparatus as claimed in claim 1, for presenting Braille characters, wherein the ends of the pins of each cell are grouped in a respective three by two rectangular array at the surface of said finger board.

5. Apparatus as claimed in claim 4, wherein the apertures are so dimensioned relative to their associated pins, respectively, that said finger board supports said pins against lateral movement.

6. Apparatus as claimed in claim 1, wherein said data storage means includes at least one shift register having a serial input for receiving said data and a plurality of parallel outputs coupled to respective elements of said presentation means for actuating said presentation means.

* * * * *